Patented July 12, 1932

1,867,069

UNITED STATES PATENT OFFICE

SEBASTIAN GASSNER, OF LEVERKUSEN-ON-THE-RHINE, AND BERTHOLD BIENERT, OF COLOGNE-ON-THE-RHINE, GERMANY, ASSIGNORS TO GENERAL ANILINE WORKS, INC., OF NEW YORK, N. Y., A CORPORATION OF DELAWARE

MANUFACTURE OF 1-HYDROXY- OR 1-ALKOXY ANTHRAQUINONE-3-CARBOXYLIC ACIDS

No Drawing. Application filed February 7, 1930, Serial No. 426,763, and in Germany February 14, 1929.

The present invention relates to a process for preparing 1-hydroxy-or 1-alkoxy anthraquinone-3-carboxylic acids and to new products obtainable thereby.

In accordance with the invention alkoxy benzophenone dicarboxylic acids, more particularly such ones as correspond to the probable general formula

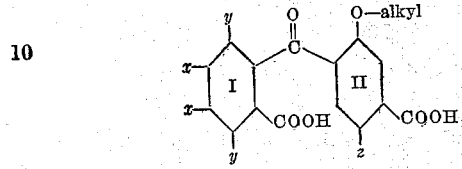

wherein $x$ and $y$ mean hydrogen or halogen, at least one $y$ being hydrogen, $z$ means hydrogen or halogen, are transformed into anthraquinone derivatives by reacting upon the former with strong sulfuric acid or fuming sulfuric acid with or without the addition of boric acid. This fact was most surprising since benzophenone dicarboxylic acids containing the carboxylic acid group of nucleus II (see the above formula) in another position of the same nucleus do not yield anthraquinone derivatives by the same treatment. Also other substituents than marked in the formula will hinder ring formation in many cases. The conditions of working according to our invention may vary in the widest limits, and this holds true as well for the ring closing agent as for the time and temperatures to be applied. For example, the compound of the formula

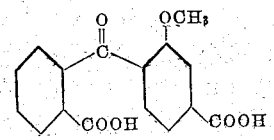

yields 1-hydroxy-anthraquinone-3-carboxylic acid in a good yield by treatment with concentrated sulfuric acid and boric acid at a temperature between about 140–200° C. or also by treatment with fuming sulfuric acid of about 20–30% $SO_3$ content and boric acid at about 100–140° C. Furthermore, the compound of the formula

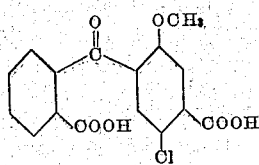

yields 1-hydroxy-4-chloroanthraquinone-3-carboxylic acid by treatment with boric acid and fuming sulfuric acid of about 30–40% $SO_3$ content on the water bath, while working with concentrated sulfuric acid and boric acid at about 145–155° C. leads to the formation of quinizarine-3-carboxylic acid in this case. Also it will be possible to avoid the simultaneous saponification of the alkoxy group in many cases. Such, for example, the compound of the formula

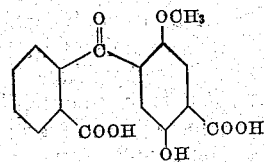

yields 1-methoxy-4-hydroxyanthraquinone-3-carboxylic acid by heating it with fuming sulfuric acid of 20% $SO_3$ content to about 80–90° C. for some minutes, while when treating the same compound at the same temperature with strong sulfuric acid and boric acid for some hours, quinizarine-3-carboxylic acid is obtained. Applicants therefore cannot give exact limits in view of the conditions at which reaction performs best, but it may be mentioned that the use, as ring closing agent, of concentrated sulfuric acid or fuming sulfuric acid of a $SO_3$ content up to about 60% and the application of temperatures between room temperature and about 200° C. generally will yield anthraquinone derivatives, containing a hydroxy- or alkoxy group in the 1-position and a carboxylic acid group in the 3-position in a good yield, the other substituents contained in the nucleus being dependent not only from the starting material but also from the more specific method of working.

The products thus obtainable which probably correspond to the general formula

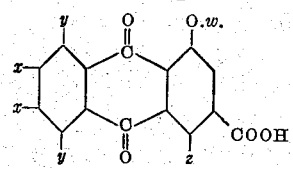

wherein $w$ means hydrogen or alkyl, $z$ hydrogen or halogen, $x$ and $y$ hydrogen or halogen, at least one $y$ being hydrogen, form yellow to red compounds, soluble in strong sulfuric acid with a yellow to bluish-red coloration, in alkalies with a red to blue coloration.

The starting materials, that is to say the alkoxy benzophenone dicarboxylic acids, may be prepared, for example, by condensing phthalic acid anhydride or a halogen substitution product thereof with a 1-hydroxy-3-methylbenzene, alkylating the reaction product, for example, by means of dimethyl sulfate and oxidizing with potassium permanganate in the presence of aqueous alkalies, as more specifically described in our copending application Serial No. 426,764.

The following examples illustrate our invention without restricting it thereto.

*Example 1*

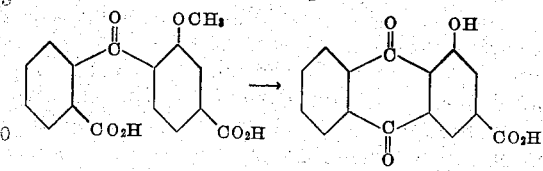

Into a solution of 24 parts by weight of crystallized boric acid dissolved in 150 parts by weight of concentrated sulfuric acid, 10 parts by weight of 2'-methoxy-benzophenone-2,4'-dicarboxylic acid are introduced and the mixture is heated for 2½–3 hours to a temperature of 150° C. After that time the melt is poured into water and the precipitated carboxylic acid is filtered after boiling up the mixture. The 1-hydroxy-anthraquinone-3-carboxylic acid thus obtained crystallizes from glacial acetic acid in form of long yellow needles, melting at 282–284° C.

*Example 2*

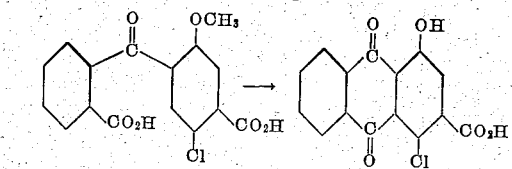

10 parts by weight of 2'-methoxy-5'-chloro-benzophenone-2,4'-dicarboxylic acid are introduced into a solution of 24 parts by weight of crystallized boric acid dissolved in 100 parts by weight of fuming sulfuric acid of 40% strength and the mixture is heated for 3–4 hours to about 90° C. The 1-hydroxy-4-chloroanthraquinone-3-carboxylic acid thus produced is precipitated by pouring into water. It crystallizes in yellow-brown needles, melting at 198–199° C.

*Example 3*

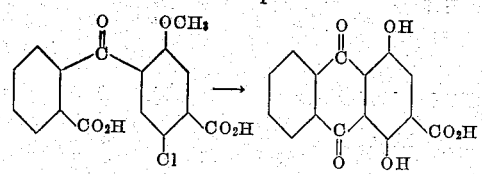

10 parts by weight of 2'-methoxy-5'-chloro-benzophenone-2,4'-dicarboxylic acid are introduced into a solution of 24 parts by weight of crystallized boric acid dissolved in 150 parts by weight of concentrated sulfuric acid or fuming sulfuric acid (containing up to 40% of $SO_3$), and the mixture is heated for 8–10 hours to about 145–150° C. The quinizarine-2-carboxylic acid thus formed is precipitated by pouring the melt into water, filtering and washing.

*Example 4*

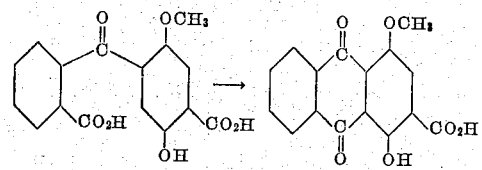

10 parts by weight of 2'-methoxy-5'-hydroxy-benzophenone-2,4'-dicarboxylic acid of the melting point 232° C. (obtainable from 2'-methoxy-5'-chlorobenzophenone-2,4'-dicarboxylic acid by heating to 140° C. with sodium acetate, potassium carbonate and copper bronze) are introduced into 100 parts by weight of fuming sulfuric acid of 20% strength, and the mixture is heated for about 15–20 minutes on the water bath. The monomethylether of quinizarine-3-carboxylic acid thus formed is precipitated by pouring the melt into water, boiling up, filtering and washing. It crystallizes from glacial acetic acid in red-brown prisms, melting at 215–216° C.

*Example 5*

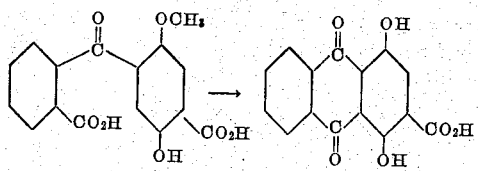

10 parts by weight of 2'-methoxy-5'-hydroxy-benzophenone-2,4'-dicarboxylic acid are introduced into a solution of 24 parts by weight of crystallized boric acid dissolved in 150 parts by weight of concentrated sulfuric acid and the mixture is heated for about 5–6 hours on the water bath. The quinizarine-2-carboxylic acid is precipitated by pouring the melt into water, boiling up, filtering and washing. It melts at 249–250° C.

We claim:—

1. Process which comprises reacting upon a compound of the formula

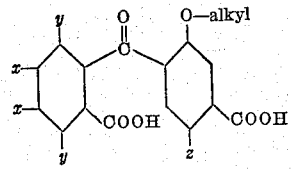

wherein $x$ and $y$ mean hydrogen or halogen, at least one $y$ being hydrogen, $z$ means hydrogen or halogen with a compound of the group consisting of concentrated sulfuric acid and fuming sulfuric acid.

2. Process which comprises reacting upon a compound of the formula

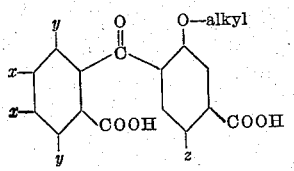

wherein $x$ and $y$ mean hydrogen or halogen, at least one $y$ being hydrogen, $z$ means hydrogen or halogen with a compound of the group consisting of concentrated sulfuric acid and fuming sulfuric acid in the presence of boric acid.

3. Process which comprises reacting upon a compound of the formula

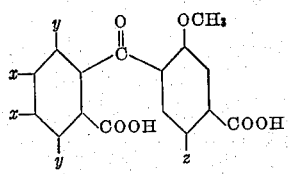

wherein $x$ and $y$ mean hydrogen or halogen, at least one $y$ being hydrogen, $z$ means hydrogen or halogen with a compound of the group consisting of concentrated sulfuric acid and fuming sulfuric acid of a $SO_3$ content up to 60% at a temperature between room temperature and 200° C.

4. Process which comprises reacting upon a compound of the formula

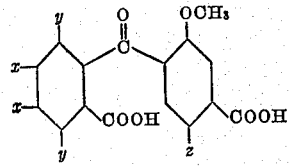

wherein $x$ and $y$ mean hydrogen or halogen, at least one $y$ being hydrogen, $z$ means hydrogen or halogen with a compound of the group consisting of concentrated sulfuric acid and fuming sulfuric acid of a $SO_3$ content up to 60% in the presence of boric acid at a temperature between room temperature and 200° C.

5. Process which comprises reacting upon the compound of the probable formula

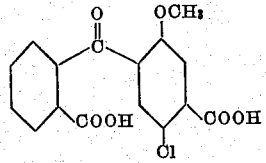

with a solution of boric acid in a compound of the group consisting of concentrated sulfuric acid and fuming sulfuric acid containing up to 40% of $SO_3$ at a temperature of about 90–150° C.

6. The products of the general formula

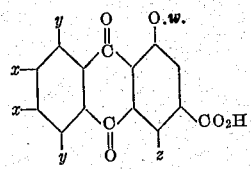

wherein $w$ means hydrogen or alkyl, $z$ hydrogen or halogen, $x$ and $y$ hydrogen or halogen, at least one $y$ being hydrogen, said compounds forming yellow to red needles soluble in strong sulfuric acid with a yellow to bluish-red coloration, in alkalies with a red to blue coloration.

7. The products of the probable general formula

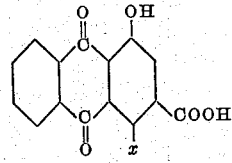

wherein $x$ means hydrogen or chlorine, said compounds being yellow to yellow-brown crystals.

In testimony whereof, we affix our signatures.

SEBASTIAN GASSNER.
BERTHOLD BIENERT.